Patented May 12, 1931

1,805,385

UNITED STATES PATENT OFFICE

ARTHUR VOSS, OF FRANKFORT-ON-THE-MAIN-HOCHST, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

HARDENED ARTIFICIAL MASS AND PROCESS OF PREPARING IT

No Drawing. Application filed September 19, 1928, Serial No. 307,042, and in Germany September 29, 1927.

My present invention relates to hardened artificial materials and process of preparing them, more particularly to materials consisting of or containing insoluble and infusible resins containing chemically entirely indifferent carboxyl groups.

By this invention hardened artificial materials, having valuable properties, are made by heating phenolaldehyde resins containing pro mol one or several carboxyl groups to a temperature above 100° C. preferably at about 150° C. to 160° C. in the presence or absence of filling materials. Furthermore I have found that infusible and insoluble masses are obtained, if the above-mentioned carboxyl-containing resins are heated in the presence of polyvalent alcohols, as for instance glycol, glycerine, mannitol and polyvinyl alcohol.

The aforesaid resins containing carboxylic acid groups (hereinafter referred to for convenience as "resin-carboxylic acids") may be obtained by reaction between a phenolaldehyde resin and a halogen fatty acid or a salt thereof, or by reaction between a phenoxy-fatty acid and formaldehyde or a substance yielding formaldehyde. I have moreover found that insoluble and infusible resins are obtained by transforming the said resins containing carboxyl groups into water-soluble compounds by neutralizing them wholly or partially with ammonia or the derivatives thereof, as for instance methylamine or pyridine, then evaporating the aqueous solution and heating the residue at a temperature between 100° C. and 200° C., preferably at about 150° C. to 160° C.

If desired, a filling material may be associated with the aqueous solution of the ammonium or other salt of the resin-carboxylic acid. New artificial materials may, for instance, be made by impregnating paper-pulp with the aqueous solution, pressing into a suitable mold and hardening by heating. By impregnating wood-paste, which is obtainable cheaply in commerce, with the solution, it is thus possible to manufacture molded articles of any shape, such as pipes, boxes, containers, dishes, casks, barrels, and other various kinds of articles of general utility. Artificial masses may also be made by impregnating paper web, superposing a number of layers of the impregnated web, and subsequently hardening the mass.

The molded articles thus obtained have valuable properties; in particular, they are entirely water-proof and extraordinarily resistant to mechanical and chemical action. According to the purpose for which the products are intended, there may be used instead of a paper-pulp or web another filling material, such as asbestos fibers, sawdust, infusorial earth, powdered horn or the like. The products have a low electrical conductivity, and are, therefore, well suited for electrical insulation. They are also applicable as substitutes for shellac and the manufacture of stiffenings for hats or caps.

By a further feature of the invention, the resin-carboxylic acids may be converted into useful hardened products by heating their ammonium salts, or salts of ammonia derivatives at a temperature above 100° C. in the presence of a polyhydric alcohol of low volatility, such as glycol, glycerine, mannitol, polyvinyl alcohol, a carbohydrate soluble in water, or the like. The hardening operation may also in this case be conducted in presence or absence of a filling material. In this method of operating, it is even possible to dispense with the conversion of the resin-carboxylic acid into its salt, and the invention accordingly includes a manufacture of hardened artificial material by heating a resin-carboxylic acid at a temperature at above 100° C. in the presence of a polyhydric alcohol of low volatility, with or without addition of a filling material, for example, the resin-carboxylic acid is dissolved in alcohol, the solution is mixed with a quantity of glycerine, equimolecular to that of the resin acid, or an equimolecular quantity of another polyhydric alcohol of low volatility, such as pentaerythritol, the solution is evaporated and the residue hardened as already described. In some cases, the solvent may be dispensed with, it being sufficient merely to mix the resin-carboxylic acid and the polyhydric alcohol, and to heat the mixture to the necessary temperature.

Products of particularly good elasticity are obtained by using as the polyvalent alcohol polyvinyl alcohol, obtainable by saponification of polyvinyl acetate.

The following examples illustrate the invention, the parts being by weight:

1) 120 parts of the artificial resin obtainable by reaction between 140 parts of formaldehyde of 30 per cent strength and 110 parts of commercial cresol in the presence of an alkali, are dissolved in 250 parts of concentrated caustic soda solution (42° Bé.) and 260 parts of water. Into the clear, somewhat viscous solution 90 parts of chloracetic acid are introduced slowly in portions at a temperature between 50° C. and 60° C. The introduction of each portion causes spontaneous evolution of heat and in order to avoid frothing the temperature is controlled so that it does not exceed 80° C. When all the chloracetic acid has been introduced, the temperature is maintained for about 20 minutes at 100° C. to 102° C. The clear solution is diluted with several times its volume of water and the resin-carboxylic acid thus obtained is precipitated by the addition of hydrochloric acid until the mass is acid in reaction. The resin acid is freed by washing from salt and other inorganic bodies. The paste so obtained is introduced whilst still moist into an aqueous solution of ammonia at a moderately raised temperature, preferably about 60° C.-65° C. The strength and quantity of the solution are such that the quantity of ammonia used is equivalent to that of the resin acid, and amounts to about 17 parts of $NH_3$; a smaller quantity of ammonia is however sufficient for obtaining a clear solution, which by reason of the presence of free carboxylic acid has an acid reaction. The acid or neutral solution may be used directly as such or it may be concentrated or diluted in any desired degree. It may be used for impregnating paper-pulp, or animal or vegetable tissues; it is also suitable for preparing lacquers because the solution is easily applied to surfaces and yields on drying a smooth lustrous film, which when heated to about 150° C. becomes infusible and insoluble. In order to obtain the product in an anhydrous solid state it is sufficient to evaporate the solution advantageously in a vacuum for the purpose of avoiding overheating. The anhydrous product is a dry powder which likewise becomes insoluble and infusible, with separation of ammonia and water vapour when heated to a temperature above 100° C. It is easily soluble in water and has, as compared with the artificial resin known as "Bakelite" the advantage that for the preparation of solutions the use of relatively expensive organic solvents may be avoided.

2) The resin-carboxylic acid (prepared as described in Example 1) is dissolved in an aqueous solution of pyridine instead of in aqueous ammonia. The hardened products obtainable from this solution in the manner already described are more elastic than those obtained as described in Example 1, but less resistant to chemical action.

3) The resin-carboxylic acid obtainable by reaction between 30 parts of paraformaldehyde and 100 parts of cresoxy-acetic acid in the presence of hydrochloric acid is freed from electrolytes by washing and then dissolved in 300 parts of an aqueous solution of methylamine of 8 per cent strength. The solution may be used in the manner described in Example 1., for impregnating materials, for the preparation of lacquers, and for the manufacture of artificial objects of various kinds.

4) The resin-like product obtained by condensation of equal parts of commercial tricresol and formaldehyde of 30 per cent strength in the presence of about 10 per cent of an alkali is mixed, without being freed from the alkali used for the condensation, with a quantity of a concentrated aqueous solution of an alkali such that the total quantity of the alkali present is equivalent to the quantity of the cresol used. Into the clear aqueous solution thus obtained there is introduced in the form of a concentrated aqueous solution, a quantity of sodium chloracetate also equivalent to the cresol used, at a temperature of about 60° C.-70° C. To a condensation product obtained from 108 parts of cresol, 108 parts of formaldehyde of 30 percent strength and 30 parts of concentrated caustic soda solution of 42° Bé., there are added to a moderate temperature (40-50° C.), a further 90 parts of caustic soda solution and 116.5 parts of sodium chloracetate, the whole being maintained at about 40° C.-50° C. until all sodium chloracetate has been introduced, after which it is heated for a short time at 95° C.-100° C. for the purpose of accelerating the reaction. The resin-acid product is precipitated by acidification with hydrochloric acid; it is a whitish resinous mass which when cold easily crumbles, but becomes soft at a moderately raised temperature. It is washed, dissolved in 400 parts of warm aqueous ammonia of 10 per cent strength, and the clear, feebly colored solution produced which has a slightly ammoniacal smell, is mixed with an aqueous solution of 25 parts of polyvinyl alcohol. After evaporating the solution so obtained on a water bath, there remains a clear resinous residue, which when further heated to about 150° C.-170° C. gradually becomes converted into a hard mass which is entirely insoluble and infusible, but nevertheless very elastic; it may conveniently be used for the preparation of articles which are required to be resistant toward thrust or other mechanical action.

5) 100 parts of the phenol-formaldehyde condensation product known as "Bakelite A", are caused to react in the manner already described with chloracetic acid, and the resin-acid thus obtained is dissolved in aqueous ammonia as described in Example 4. The aqueous solution is mixed with 15 parts of glycerine of 97 per cent strength, the mixture is kneaded with a quantity of paper-pulp of 22 per cent strength, such that a uniform pasty mass is produced. The mass is freed from a part of the solution by pressing, the solid cake so obtained is pressed in suitable molds which are then heated internally or externally. There are thus obtained homogeneous hardened objects which are very resistant to mechanical and chemical actions and are distinguished by their low specific gravity.

6) The condensation product prepared in the manner indicated in Example 4. from tricresol, formaldehyde and chloroacetic acid is isolated from its alkaline solution by acidifying, washing out and drying. 100 parts of the powdery resin-carboxylic acid thus obtained are mixed with three times its weight of diatomaceous earth, the mixture is filled into a mold and maintained in the closed mold for ½ hours at a temperature of about 190° C. to 200° C. After cooling, the mass thus obtained may be removed from the mold. It is very resistant and can be used for the preparation of various commodities, as such for instance, as boxes, switchboards, telephone receivers or the like.

7) 125 parts of artificial resin, obtained by causing 40 parts of paraldehyde to act upon 100 parts of technical cresol, and which is soluble in alkali are treated with 140 parts of bromo-propionic acid in the manner described in the preceding examples. The isolated resin-carboxylic acid is melted and into the melt are introduced while well stirring 35 parts of glycol at a temperature of about 130° C. The resinous mass is then heated in a mold to a temperature of from 180° C. to 190° C. and maintained at this temperature for about 3 hours. After cooling, a hard, elastic body is obtained, which is no longer fusible nor soluble in the known organic solvents.

8) By causing 40 parts of paraformaldehyde to act for about half an hour at 80° C. to 100° C. upon 100 parts of phenol with a small quantity of a catalyst added thereto, as for instance ⅔ parts of lactic acid, there is obtained a resin which is treated in its alkaline solution with chloracetic acid in the manner indicated in the foregoing examples. The isolated resin-carboxylic acid is dissolved in alcohol of three times its weight, to the solution are added 30 parts of sorbitol and the alcohol is then distilled off in vacuo. The remaining resinous mass is then mixed with 250 parts of casein, the mixture is filled into molds and hardened by heating it for several hours to 150° C. to 160° C. The artificial mass thus obtained is very suitable for isolating purposes and for use in electrotechnics.

I claim:

1. The process which consists in heating phenolaldehyde condensation products containing carboxyl groups to a temperature of between 100° C. and 200° C.

2. The process which consists in heating condensation products, obtained from a phenolaldehyde resin and a halogen fatty acid, to a temperature of between 100° C. and 200° C.

3. The process which consists in heating condensation products, obtained from chloroacetic acid and the condensation product of phenol and formaldehyde, to a temperature of between 100° C. and 200° C.

4. The process which consists in heating phenolaldehyde condensation products containing carboxyl groups with the addition of a polyvalent alcohol to a temperature of between 100° C. and 200° C.

5. The process which consists in heating condensation products, obtained from a phenolaldehyde resin and a hologen fatty acid with the addition of a polyvalent alcohol to a temperature of between 100° C. and 200° C.

6. The process which consists in heating condensation products, obtained from chloroacetic acid and the condensation product of phenol and formaldehyde with the addition of a polyvalent alcohol to a temperature of between 100° C. and 200° C.

7. The process which consists in heating condensation products, obtained from chloroacetic acid and the condensation product of phenol and formaldehyde, with the addition of glycerine to a temperature of between 100° C. and 200° C.

8. As new products, insoluble and infusible resins containing chemically entirely indifferent carboxyl groups, substantially identical with resins obtainable by heating phenolaldehyde condensation products containing carboxyl groups to a temperature of between 100° C. and 200° C.

9. As new products, insoluble and infusible resins containing chemically entirely indifferent carboxyl groups, substantially identical with resins obtainable by heating condensation products, obtained from a phenolaldehyde resin and a halogen fatty acid, to a temperature of between 100° C. and 200° C.

10. As new products, insoluble and infusible resins containing chemically entirely indifferent carboxyl groups, substantially identical with resins obtainable by heating condensation products, obtained from chloroacetic acid and the condensation product of phenol and formaldehyde, to a temperature of between 100° C. and 200° C.

11. As new products, insoluble and infusible resins containing chemically entirely indifferent carboxyl groups, substantially identical with resins obtainable by heating phenolaldehyde condensation products containing carboxyl groups with the addition of a polyvalent alcohol to a temperature of between 100° C. and 200° C.

12. As new products, insoluble and infusible resins containing chemically entirely indifferent carboxyl groups, substantially identical with resins obtainable by heating condensation products, obtained from a phenolaldehyde resin and a halogen fatty acid, with the addition of a polyvalent alcohol to a temperature of between 100° C. and 200° C.

13. As new products insoluble and infusible resins containing chemically entirely indifferent carboxyl groups, substantially identical with resins obtainable by heating condensation products, obtained from chloroacetic acid and the condensation product of phenol and formaldehyde, with the addition of a polyvalent alcohol to a temperature of between 100° C. and 200° C.

14. As new products, insoluble and infusible resins containing chemically entirely indifferent carboxyl groups, substantially identical with resins obtainable by heating condensation products, obtained from chloroacetic acid and the condensation product of phenol and formaldehyde, with the addition of glycerine to a temperature of between 100° C. and 200° C.

In testimony whereof, I affix my signature.

Dr. ARTHUR VOSS.

sible resins containing chemically entirely indifferent carboxyl groups, substantially identical with resins obtainable by heating phenolaldehyde condensation products containing carboxyl groups with the addition of a polyvalent alcohol to a temperature of between 100° C. and 200° C.

12. As new products, insoluble and infusible resins containing chemically entirely indifferent carboxyl groups, substantially identical with resins obtainable by heating condensation products, obtained from a phenolaldehyde resin and a halogen fatty acid, with the addition of a polyvalent alcohol to a temperature of between 100° C. and 200° C.

13. As new products insoluble and infusible resins containing chemically entirely indifferent carboxyl groups, substantially identical with resins obtainable by heating condensation products, obtained from chloroacetic acid and the condensation product of phenol and formaldehyde, with the addition of a polyvalent alcohol to a temperature of between 100° C. and 200° C.

14. As new products, insoluble and infusible resins containing chemically entirely indifferent carboxyl groups, substantially identical with resins obtainable by heating condensation products, obtained from chloroacetic acid and the condensation product of phenol and formaldehyde, with the addition of glycerine to a temperature of between 100° C. and 200° C.

In testimony whereof, I affix my signature.

DR. ARTHUR VOSS.

CERTIFICATE OF CORRECTION.

Patent No. 1,805,385.  Granted May 12, 1931, to

ARTHUR VOSS.

It is hereby certified that error appears in the printed specification of the above numbered patent requiring correction as follows: Page 3, line 28, for the fraction "½" read 1-2, and line 55, for "2/3" read 2-3; and that the said Letters Patent should be read with these corrections therein that the same may conform to the record of the case in the Patent Office.

Signed and sealed this 14th day of July, A. D. 1931.

(Seal)

M. J. Moore,
Acting Commissioner of Patents.

CERTIFICATE OF CORRECTION.

Patent No. 1,805,385.  Granted May 12, 1931, to

ARTHUR VOSS.

It is hereby certified that error appears in the printed specification of the above numbered patent requiring correction as follows: Page 3, line 28, for the fraction "½" read 1-2, and line 55, for "2/3" read 2-3; and that the said Letters Patent should be read with these corrections therein that the same may conform to the record of the case in the Patent Office.

Signed and sealed this 14th day of July, A. D. 1931.

(Seal)

M. J. Moore,
Acting Commissioner of Patents.